United States Patent Office 2,886,606
Patented May 12, 1959

2,886,606

PROCESS OF PRODUCING HEXACHLORO BENZENE FROM HEXACHLORO CYCLOHEXANES

Joachim Mattner, Berlin-Charlottenburg, Germany, assignor to Schering A.G., Berlin, Germany, a corporation of Germany No Drawing. Application July 5, 1956
Serial No. 595,862

Claims priority, application Germany July 5, 1955

3 Claims. (Cl. 260—650)

The present invention relates to a process of producing hexachloro benzene and more particularly to a process of producing hexachloro benzene by catalytic treatment of (1,2,3,4,5,6) hexachloro cyclohexane with chlorine.

The present application is a continuation-in-part of my copending application Serial No. 429,700, filed May 13, 1954, now U. S. Patent 2,806,070 and entitled "Process of Producing Polychloro Benzenes From (1,2,3,4,5,6) Hexachloro Cyclohexanes."

When producing gamma-hexachloro cyclohexane, it is not possible to completely avoid the formation of isomers of said gamma-(1,2,3,4,5,6)-hexachloro cyclohexane. Satisfactory utilization of said (1,2,3,4,5,6) hexachloro cyclohexane isomers is a very important technical problem, since it will considerably reduce the cost of the valuable gamma-(1,2,3,4,5,6)-hexachloro cyclohexane.

It is known that hexachloro benzene can be produced by allowing chlorine to react with fused (1,2,3,4,5,6) hexachloro cyclohexane.

It is also known that ferric chloride and aluminum chloride as well as iron powder deposited on pumice may serve as catalysts in said reaction.

The reaction can also be carried out at a temperature between 350° C. and 360° C. in the gaseous phase. Thereby, the reaction chamber may be filled with substances capable of increasing the surface area thereof. It is, however, not possible to use aluminum chloride, ferric chloride, or iron catalysts when working in the gaseous phase because said compounds are very rapidly carried off from the reaction chamber by sublimation. When using iron as catalyst in this reaction, such iron is carried off in the form of ferric chloride.

The process according to my copending application Serial No. 429,700 (now U. S. Patent 2,806,070) comprises the use of metal containing catalysts, for instance, of activated aluminum oxide in the process operating in the gaseous phase. The addition of such metal containing catalysts has the result that the throughput of (1,2,3, 4,5,6) hexachloro cyclohexane can be considerably increased over that obtained when proceeding without catalyst addition. Furthermore, the presence of such a metal containing catalyst renders possible operation at a low temperature.

It is one object of the present invention to provide a simple and effective process of converting (1,2,3,4,5,6) hexachloro cyclohexane in the gaseous phase in hexachloro benzene whereby a catalyst is used the activity of which surpasses that of all the other catalysts heretofore suggested for this reaction.

Other objects of the present invention and advantageous features thereof will become apparent as the description proceeds.

In principle, the process according to the present invention comprises the use of a catalyst capable of adsorbing gases, preferably highly porous charcoal such as gas adsorption coal, i.e. activated charcoal, jointly with a metal-containing catalyst, preferably aluminum oxide.

A number of commercially available activated charcoals contain some zinc and iron due to their process of manufacture. However, the amounts of said metal compounds are so small that such activated charcoals alone do not exhibit the desired activity without any further addition of suitable metal compounds. Although such activated charcoals containing small amounts of metal compounds are more highly active than ordinary, metal-free adsorption coals such as, for instance, charcoal, they are still less active than, for instance, activated alumina alone. Table I given hereinafter shows these differences in activity.

In order to explain the surprising improvement of activity by the joint use of gas adsorbing substance and catalyst suitable for chlorinating pyrolysis, the following theory is advanced without, however, limiting the process to such a theory:

The gas adsorbing substance is charged with chlorine at its surface. As a result thereof, the chlorine concentration at its surface is very high. The high concentration of a reaction participant causes a high speed of reaction. This increase in speed of reaction, however, actually does not become evident to a considerable extent because the reaction as such is still a relatively low one. Its speed of reaction, then is further increased by the metal containing catalyst present in the reaction mixture. Thus, by a very favorable cooperation of two catalytic agents which are quite different from each other and which, as such, are capable of increasing the speed of reaction an expectedly high efficiency is achieved. This high efficiency is due to an increase in speed of reaction by increasing the concentration of the one reaction component and by increasing the speed of reaction by catalytic effects. As gas adsorbing agent, preferably so-called A-coal or gas adsorption coal, i.e. activated charcoal is employed. The preferred metal containing catalysts are preferably catalysts which do not volatilize under the reaction conditions or which are volatile only to a very slight extent. Oxides, such as, for instance, titanium dioxide, however, are less suitable for the joint application with charcoal because they form considerable amounts of volatile titanium compounds which contaminate the reaction products and, thus, are removed from the reaction chamber so that the catalyst becomes poorer and poorer with respect to titanium.

The preferred metal containing catalyst for the purpose of the present invention are, for instance, the oxides of elements the halogenides of which cause Friedel-Crafts reaction. Such oxides can be used as such or also in mixture with each other. Other metal compounds may also be added thereto. The procedure in producing such catalysts according to the present invention is, for instance, as follows:

A highly effective activated charcoal (gas adsorption coal) is impregnated with a concentrated solution of aluminum chloride ($AlCl_3.6H_2O$). The impregnated activated charcoal is dried first at about 100° C. and finally at about 300° C. Thereby the aluminum chloride is converted into hydrated aluminum oxides which yield thereby a highly active alumina. It is also possible to simply mix activated charcoal with activated alumina as it is commercially available, for instance, as product of Badische Anilin- und Sodafabrik or of Degussa. Such a mixture is then used as catalyst.

When proceeding under otherwise the same conditions but using the new catalyst, the yields are better, the resulting hexachloro benzene is of a higher degree of purity, and the throughput is greater, i.e. the yield per reaction chamber unit and time unit is greater. Furthermore it is unnecessary to use such a large excess of chlorine as heretofore required. In addition thereto, the temperature at which reaction is carried out is lower. It is, however, not necessary to use lower reaction temperature. On the contrary, it is well possible to employ reaction temperatures of, for instance, 500° C. and above.

To considerably reduce the chlorine excess or to avoid such an excess, is not only of advantage for economical reasons but it also diminishes or avoids the difficulties which are involved in the removal of non-reacted chlorine. The possibility to carry out the process at low temperature has not only the advantage of lower costs for heating and of reducing the costs as well as the technical requirements for dissipating the heat of reaction from the reaction products but has also considerable advantages with respect to the structural materials to be used in the required apparatus. Corrosion of all metal parts is diminished to an extraordinary extent.

Thus, for instance, corrosion of nickel which represents a suitable structural material for constructing reaction furnaces used in the process according to the present invention, increases very considerably with increasing temperature. The possibility of being able to operate at lower temperature increases many times the service life, for instance, of a nickel furnace. Furthermore the reaction products are hardly contaminated by the products of corrosion.

The above mentioned advantages are proven by the following comparative tests which are illustrated by Table I. The (1,2,3,4,5,6)hexachloro cyclohexane isomers obtained by chlorinating benzene and remaining after separation of gamma-(1,2,3,4,5,6)hexachloro cyclohexane are used as starting materials. The purity of the resulting final product with respect to its content of hexachloro benzene was determined, in each instance, by using a crude product washed once with methanol.

tained when using the combination catalyst according to the present invention. The possibility of a very considerable reduction of the necessary reaction temperature, when proceeding according to the present invention, is evident from a comparison of experiment 5 with experiments 1 and 2. Although the reaction temperature employed in experiment 5 is about 100° lower than the reaction temperature employed in experiments 1 and 2, the result is better not only with respect to the yield but also with respect to the purity of the resulting hexachloro benzene. It is, of course, understood that an experimental temperature of 300° C. does not represent the limit of effectiveness of the new catalyst as is evident from the following examples.

The following table illustrates comparative tests regarding the speed of throughput.

TABLE II

| Catalyst | Reaction temperature, degrees | Throughput of HCH per hour, g. | Molar ratio of HCH: Cl$_2$ | Volume of the reaction chamber, cc. | Yield of hexachloro benzene, percent |
| --- | --- | --- | --- | --- | --- |
| Activated alumina BASF | 400 | 333 | 1:3.9 | 1,000 | 85.5 |
|  | 400 | 345 | 1:3.7 | 200 | 64.0 |
| Gas adsorption coal (activated charcoal) impregnated with aluminum chloride solution and dried | 300 | 376 | 1:3.45 | 200 | 87 |

When using activated alumina as catalyst and when increasing the speed of throughput five times (by reducing the volume of the reaction chamber from 1000 cc. to 200 cc.), the yield of hexachloro benzene which originally is 85.5%, drops to 64.0%. In contrast thereto, when using the combination catalyst according to the present invention, there is still obtained the same yield of 87% although the speed of throughput (200 cc. of volume of the reaction chamber) is equally high and although the temperature is about 100° C. lower than the temperature employed when using activated alumina. Furthermore the molar ratio of (1,2,3,4,5,6) hexachloro cyclohexane:chlorine is much more unfavorable than in the experiments with activated alumina.

When using less than the theoretical amount of chlorine, there are obtained as by-product corresponding amounts of tetrachloro benzene. Hexachloro benzene and tetrachloro benzene can be separated quite readily by

TABLE I

| Experiment No. | Catalyst | Reaction temp., °C. | Throughput of HCH per hour, g. | Molar ratio of HCH:Cl$_2$ | Yield | | | Purity of hexachloro benzene, percent |
| --- | --- | --- | --- | --- | --- | --- | --- | --- |
| | | | | | tri-chloro benzene, percent | tetra-chloro benzene, percent | hexa-chloro benzene, percent | |
| 1 | Gas adsorption coal (activated charcoal). | 400 | 358 | 1:3.6 | 39 | 22 | 32 | 72 |
| 2 | Activated alumina BASF | 400 | 345 | 1:3.7 | 3 | 27 | 64 | 88 |
| 3 | Gas adsorption coal (activated charcoal). | 300 | 340 | 1:3.8 | 59 | 19 | 18 | 58 |
| 4 | Activated alumina BASF | 300 | 385 | 1:3.4 | 18 | 39 | 39 | 60 |
| 5 | Gas adsorption coal (activated charcoal) impregnated with AlCl$_3$ solution and dried. | 300 | 376 | 1:3.5 | 0 | 9 | 87 | 97 |

HCH as used herein indicates hexachloro cyclohexane.

The experiments 3, 4, and 5 show that considerably improved yields are obtained when proceeding with the addition of the catalyst according to the present invention at 300° C. under otherwise approximately the same reaction conditions. The yield is considerably higher than that obtained with activated alumina alone or with activated charcoal alone. Furthermore, these three experiments show that a much purer hexachloro benzene is obtained partial conversion into phenols whereby the hexachloro benzene is converted into pentachloro phenol while the tetrachloro benzene is not affected. When using the highly active catalyst according to the present invention, it may be expedient to reduce the speed of reaction somewhat at the beginning of the reaction tube (if such a tube is used as reaction chamber) because considerable amounts of heat are set free by the reaction. Such reduction in speed of reaction is preferably effected by using the catalyst in a somewhat diluted form at the beginning of the tube, for instance, in such a manner that first activated alumina is filled into the tube and then gradually more and more gas adsorption coal (activated charcoal) which might be impregnated with aluminum chloride solution, is admixed to said activated aluminum oxide until the mixture has a volume ratio of, for instance, 1:1. In this manner temperature regulation is considerably facilitated and the stability of the catalyst is increased.

The following examples serve to illustrate the present invention without, however, limiting the same thereto.

Example 1

As catalyst there is used granulated gas adsorption coal (activated charcoal) impregnated with a concentrated aqueous aluminum chloride solution (1 part of aluminum chloride $AlCl_3.6H_2O$ to one part of water) in the proportion of 55 parts by weight of charcoal to 40 parts by weight of said aluminum chloride solution. The impregnated charcoal was then dried first at 70° C. and then at 250° C.

The reaction chamber is a glass tube with a capacity of about one liter for the catalyst.

The tube is heated to 270° C. and 301 g. of (1,2,3,4,5,6) hexachloro cyclohexane isomers obtained as by-products in the production of γ-(1,2,3,4,5,6) hexachloro cyclohexane, mixed with 100 liters of chlorine are passed per hour through the tube. Hexachloro benzene is obtained in the form of purely white crystals of the melting point 225–226° C. The yield is about 100%.

Example 2

The catalyst is the same as described in Example 1, i.e. gas adsorption coal (activated charcoal) impregnated with aluminum chloride solution and dried. The reaction chamber is a glass tube of 200 cc. capacity which is filled with said activated charcoal. The reaction chamber is heated to 270° C. and a mixture of 284 g. of (1,2,3,4,5,6) hexachloro cyclohexane isomers and 100 liters of chlorine are passed per hour through said tube. Although the speed of throughput is quite high and the temperature is quite low, hexachloro benzene is obtained in a yield of 81.5% (calculated for 100% hexachloro benzene). In addition thereto about 12% of tetrachloro benzene are obtained.

Example 3

A glass tube of one liter volume is filled with a mixture of activated charcoal and activated alumina (BASF) in the ratio of 1:1. The tube is heated to a temperature of 290–300° C. and a mixture of (1,2,3,4,5,6) hexachloro cyclohexane isomers obtained as byproducts in the production of γ-(1,2,3,4,5,6) hexachloro cyclohexane, and chlorine is passed through said tube in a molar ratio of 1:3. 480 g. of hexachloro cyclohexane are evaporated per hour. White, well crystallizing hexachloro benzene of the melting point 220° C. is obtained in a yield of about 90%.

Example 4

A glass tube of one liter capacity is filled with gas adsorption coal (activated charcoal) which was impregnated with aluminum chloride solution and was subsequently dried as described in Example 1. The tube is heated to 340° C. and 377 g. of (1,2,3,4,5,6) hexachloro cyclohexane isomers obtained as by-products in the production of γ-(1,2,3,4,5,6) hexachloro cyclohexane, per hour are passed therethrough at said temperature. So much chlorine is admixed to said (1,2,3,4,5,6) hexachloro cyclohexane that the molar ratio of (1,2,3,4,5,6) hexachloro cyclohexane to chlorine is 1:3.4. 365 g. of hexachloro benzene of the melting point 228° C. are obtained within an hour. The yield corresponds to a yield of 99%.

Example 5

The catalyst is gas adsorption coal (activated charcoal) impregnated with ferric chloride solution. The amount of ferric chloride is 0.2 part by weight for one part by weight of charcoal. The catalyst is dried at 400° C. and the ferric chloride is converted thereby for the most part into ferric oxide. The catalyst is filled into a glass tube of one liter capacity. A mixture of 265 g. of (1,2,3,4,5,6) hexachloro cyclohexane isomers and 75 liters of chlorine is passed at a temperature of 290° C. through said tube within 30 minutes. 255 g. of hexachloro benzene of the melting point 228° C. which corresponds very closely to the theoretical melting point given, for instance, by the "Taschenbuch fuer Chemiker und Physiker" by D'Ans and Lax as 227.6° C. The yield corresponds to a yield of 98.5%.

Example 6

The same catalyst as used in Example 2 is filled into a tube of 200 cc. capacity. The temperature of the catalyst is kept at 480–500° C. 327 g. of hexachloro cyclohexane isomers obtained as byproducts in production of γ-(1,2,3,4,5,6) hexachloro cyclohexane and 100 liters of chlorine per hour are passed through the reaction tube. 303 g. of hexachloro benzene of the melting point 227° C. are obtained within one hour. The yield is 95%.

Example 7

The catalyst is produced as follows:
150 g. of aluminum chloride ($AlCl_3.6H_2O$) and 50 g. of cupric chloride ($CuCl_2.2H_2O$) are dissolved in 200 cc. of water. 1.4 liters of granulated gas adsorption coal (activated charcoal) are impregnated with the warm solution of said chlorides. The mixture is first dried on the steam bath and is subsequently dried at 300° C.

A glass tube 1 liter capacity for the catalyst is filled therewith, heated to 300° C., and (1,2,3,4,5,6) hexachloro cyclohexane isomers and chlorine are passed through said tube in a molar ratio of 1:3.29 at said temperature of 300° C. The speed of throughput amounts to 393 g. of (1,2,3,4,5,6) hexachloro cyclohexane per hour. 373 g. of hexachloro benzene of the melting point 226° C. are obtained thereby within one hour. The yield corresponds to a yield of 97%.

Other metal containing catalysts than activated alumina and/or activated ferric oxide given in the preceding examples may also be employed in combination with activated charcoal and the like gas adsorbing agents. Such other oxides are, for instance, $Cr_2O_3$, $ZrO_2$, $Co_2O_3$, $NiO$, $ZnO$, $CnO$, $CoCl_2$, $ThO_2$, $BeO$ or mixtures as $Cr_2O_3+Fe_2O_3$, $Al_2O_3+Cr_2O_3$, $BeO+Fe_2O_3$, $Fe_2O_3+CuCl_2$, $Cr_2O_3+ZnCl_2$ etc.

The reaction temperature may be as high as 600° C. but should not be lower than about 200° C. The preferred temperatures are temperatures between about 270° C. and 340° C. although higher and lower temperatures may also be used.

Other changes and variations in the reaction conditions, temperatures and duration, ratio of chlorine to (1,2,3,4,5,6) hexachloro cyclohexane in the reaction gas mixture, velocity of flow of said reaction gas mixture, methods of working up the resulting hexachloro benzene and of purifying the same, and the like may be made by those skilled in the art in accordance with the principles set forth herein and in the claims annexed hereto.

I claim:
1. In a process of producing hexachloro benzene from (1,2,3,4,5,6) hexachloro cyclohexanes, the step comprising passing a mixture of (1,2,3,4,5,6) hexachloro cyclohexane isomers, obtained as by-products in the production of γ-(1,2,3,4,5,6) hexachloro cyclohexane, in the gaseous phase together with chlorine through a reaction zone containing a catalyst mixture of activated charcoal and activated aluminum oxide at a temperature between about 200° C. and about 600° C.

2. In a process of producing hexachloro benzene from (1,2,3,4,5,6) hexachloro cyclohexanes, the step comprising passing a mixture of (1,2,3,4,5,6) hexachloro cyclohexane isomers, obtained as by-products in the production of γ-(1,2,3,4,5,6) hexachloro cyclohexane, in the gaseous phase together with chlorine through a reaction zone containing a catalyst mixture of activated charcoal impregnated with activated aluminum oxide at a temperature between about 200° C. and about 600° C.

3. In a process of producing hexachloro benzene from (1,2,3,4,5,6) hexachloro cyclohexanes, the step comprising passing a mixture of (1,2,3,4,5,6) hexachloro cyclohexane isomers, obtained as by-products in the production of γ-(1,2,3,4,5,6) hexachloro cyclohexane, in the gaseous phase together with chlorine through a reaction zone containing a catalyst mixture of activated charcoal impregnated with activated aluminum oxide and cupric oxide at a temperature between about 200° C. and about 600° C.

References Cited in the file of this patent

UNITED STATES PATENTS

| | | |
|---|---|---|
| 2,724,002 | Viriot | Nov. 15, 1955 |
| 2,757,211 | Giraitis et al. | July 31, 1956 |
| 2,806,070 | Mattner | Sept. 10, 1957 |